United States Patent [19]

Ochs

[11] Patent Number: 4,921,074

[45] Date of Patent: May 1, 1990

[54] VEHICLE LIFTING PLATFORM ATTACHMENT

[76] Inventor: Eckhard Ochs, Falderbaumstrasse 34, 3500 Kassel-Waldau, Fed. Rep. of Germany

[21] Appl. No.: 274,419

[22] Filed: Nov. 21, 1988

Related U.S. Application Data

[63] Continuation of Ser. No. 56,549, May 29, 1987, abandoned.

[30] Foreign Application Priority Data

May 30, 1986 [DE] Fed. Rep. of Germany ....... 3618160

[51] Int. Cl.[5] ............................................ B60S 13/00

[52] U.S. Cl. ................................ 187/8.71; 187/8.47; 187/18; 254/89 H

[58] Field of Search .................... 187/8.41, 8.43, 8.49, 187/8.5, 8.71, 8.72, 18, 8.77, 8.75; 182/141; 254/122, 89 H, 93 HP

[56] References Cited

U.S. PATENT DOCUMENTS

| | | | |
|---|---|---|---|
| 3,174,722 | 3/1965 | Alm | 187/18 |
| 3,228,659 | 1/1966 | Starm | 187/18 |
| 3,367,449 | 2/1968 | Pelouch | 187/8.75 |
| 3,891,108 | 6/1975 | Traficant | 254/122 |
| 4,212,374 | 7/1980 | Bubik | 187/8.43 |
| 4,238,003 | 12/1980 | Hunter | 187/8.71 |
| 4,319,666 | 3/1982 | Hunter | 254/89 H |
| 4,573,663 | 3/1986 | Nussbaum | 254/89 H |

*Primary Examiner*—H. Grant Skaggs
*Assistant Examiner*—Kenneth Noland
*Attorney, Agent, or Firm*—Collard, Roe & Galgano

[57] ABSTRACT

An attachment is set forth which can be removably attached to a standard vehicle lifting platform. The lifting platform attachment includes a scissors support formed from two parallel pairs of scissors. The attachment also includes a support plate having an air spring bellows arranged beneath it. The scissors support and air spring bellows are mounted on a base plate. The base plate may then be fixed on the driving track of a vehicle lifting platform. The support plate is stepped on both sides to permit the vehicle to drive onto the attachment.

2 Claims, 3 Drawing Sheets

FIG.3
FIG.2
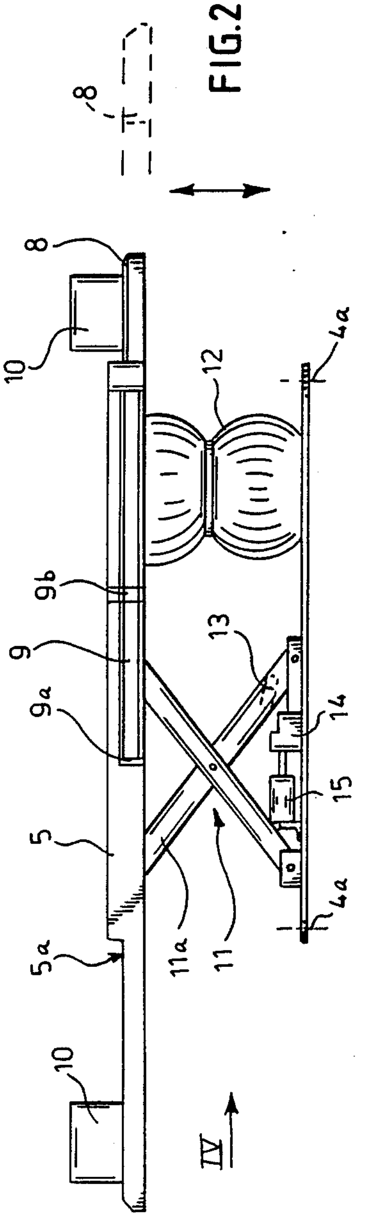
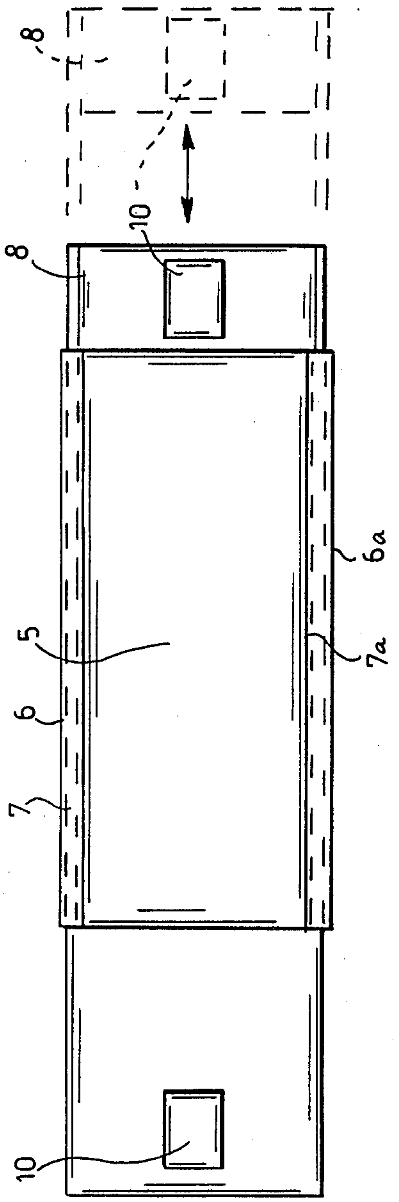

VEHICLE LIFTING PLATFORM ATTACHMENT

This is a continuation application of application Ser. No. 056,549, filed May 29, 1987, for "Vehicle Lifting Platform Attachment" which is abandoned.

BACKGROUND OF THE INVENTION

1. Field of the Invention

The invention relates to a lifting platform attachment. More particularly, it relates to a lifting platform attachment for a motor vehicle lifting platform or drive-on mechanics pit with driving tracks. The lifting platform attachment consists of a scissors support comprised of two parallel pairs of scissors, and a support plate.

2. Description of the Prior Art

A prior art lifting platform attachment for a motor vehicle lifting platform is disclosed in U.S. Pat. No. 4,319,666. This attachment is designed to be placed between the driving tracks in a bridge-like fashion. This known lifting platform attachment consists of four pairs of scissors, which are arranged in the form of a square, whereby an air spring bellows is arranged between the pairs of scissors and supported on a separator or special intermediate plate.

With such a lifting platform attachment, a vehicle can be raised only either in the front or in the rear. If the total vehicle is to be lifted, for example, so as to have all four wheels freely suspended, provision has to be made for two such bridge-like lifting platform attachments. If, however, two such bridge-like lifting platform attachments are installed between the driving tracks, the space below the vehicle is inaccessible or accessible only with difficulty. With this being the case, repair work cannot be performed in the area where the bridge-like lifting platform attachment is located.

It is therefore an object of this invention to create a lifting platform attachment that is designed in such a way that it can be fitted on the existing, known lifting platforms with driving tracks, or drive-on work pits.

It is a further object of this invention to provide a lifting platform attachment which is arranged in such a way that the total vehicle can be raised with its undercarriage or understructure readily accessible from all sides.

It is still another object of the invention to provide a lifting platform attachment which assures both good stability and easy driving or moving of the vehicle across the lifting platform attachment.

SUMMARY OF THE INVENTION

According to the invention, these objects are accomplished by mounting on each driving track a lifting platform attachment in the form of a separate unit that can be fitted on existing lifting platform equipment. This means that already installed motor vehicle lifting platforms can be later equipped with such a lifting platform attachment. At the same time, this attachment ensures that the undercarriage of the vehicle is accessible from all sides, as the space between the driving tracks is freely accessible.

To ensure that the constructional height of the lifting platform attachment is as low as possible, the lifting platform attachment includes a scissors support formed from two parallel pairs of scissors. The attachment also includes a support plate having an air spring bellows arranged beneath it.

In a particularly advantageous embodiment of the present invention, at least one air spring bellows is arranged beneath the support plate outside of the scissors-type support. In this embodiment, the spring bellows is spaced to the side of the scissors-support in the longitudinal direction of the driving tracks. Due to the arrangement of the air spring bellows laterally of the scissors support, the lifting platform attachment will not be wider than the driving track. This, of course, enhances the stability of the lifting platform attachment.

Furthermore, this embodiment of the invention provides a lifting platform attachment which is low-profile or of a flat construction due to the use of an air spring bellows. Additionally, this embodiment provides for a narrow construction due to the fact that the air spring bellows is arranged on the outside of the scissors-type support.

The scissors support and the air spring bellows of the present invention are mounted on a base plate. The base plate can be fixed on the driving track of the lifting platform. This facilitates the installation of such a lifting platform attachment and leads to a low overall height of the attachment as well.

The support plate has a step on both sides. The step is located at either end of the support plate which makes the overall length of the support plate shorter than a support plate provided with wedge attachments. The step does not make it any more difficult to drive the vehicle across the support plate. Such a stepped embodiment permits one to move the rubber-made spacer blocks (which are arranged between the support plate and the strut of the motor vehicle) up to the end of the support plate. This is not possible with the wedge attachments normally mounted on the support plate. The rubber spacing blocks would in that case be disposed on these bevelled wedge attachments and therefore would be inclined. The step arrangement provides a flat surface on which to mount the spacer blocks.

Furthermore, provision is made for a jib plate on at least one side of the support plate. The jib plate is telescopically extendable from the support plate. The jib plate is supported by telescopic arms which slide within openings in the support plate. The thickness of the jib plate is normally about half the thickness of the support plate. In this way, even motor vehicles with a large spacing between their axles can be safely supported on the lifting platform attachment, since the length of the support plate can be adapted to the axle base.

The base plate and the support plate form the top and bottom, sealing plates of the air spring bellows. Consequently, the sealing panels normally used for the air spring bellows can be dispensed with. This design reduces the overall height of the attachment.

A provision is made for a stop means on the support plate for limiting the length of extension of the jib plate. This limits the moment acting on the telescopic arms. This moment results from the weight of the vehicle coupled with the length of extension and can be controlled by varying the length of the extension. The telescoping arms are supported in matching guides of the support plate, and with their other ends fastened on the jib plate.

A locking mechanism is provided for the scissors-type support. This locking mechanism is comprised of support strut arranged between two parallel pairs of scissors, and a stepped wedge supporting the support strut. In this way, the scissors support can be locked at a certain level. Thus, the vehicle remains in its raised position even in the event of a pressure drop in the air spring bellows.

The stepped wedge is pushed under the support strut as the air spring bellows is performing its lifting motion. A piston-and-cylinder drive is used to move the wedge into locking position. The displacement of the piston is dependent upon the height of lift or travel of the air spring bellows. In this way, the stepped wedge is advanced under the support strut whenever a certain height of lift has been reached. Consequently, in the event of failure or breakdown of the air spring bellows, the lifting platform attachment cannot drop or lower itself by more than one step of the stepped wedge.

Other objects and features of the present invention will become apparent from the following detailed description considered in connection with the accompanying drawings, which disclose one embodiment of the invention. It is to be understood that the drawings are to be used for the purpose of illustration only, and not as a definition of the limits of the invention.

BRIEF DESCRIPTION OF THE DRAWINGS

In the drawings, wherein similar reference characters denote similar elements throughout the several views:

FIG. 2 is a side elevational view of a lifting platform attachment of the present invention;

FIG. 3 is a top view of the lifting platform atttachment of the present invention;

DETAILED DESCRIPTION OF THE PREFERRED EMBODIMENT

Figure 1:
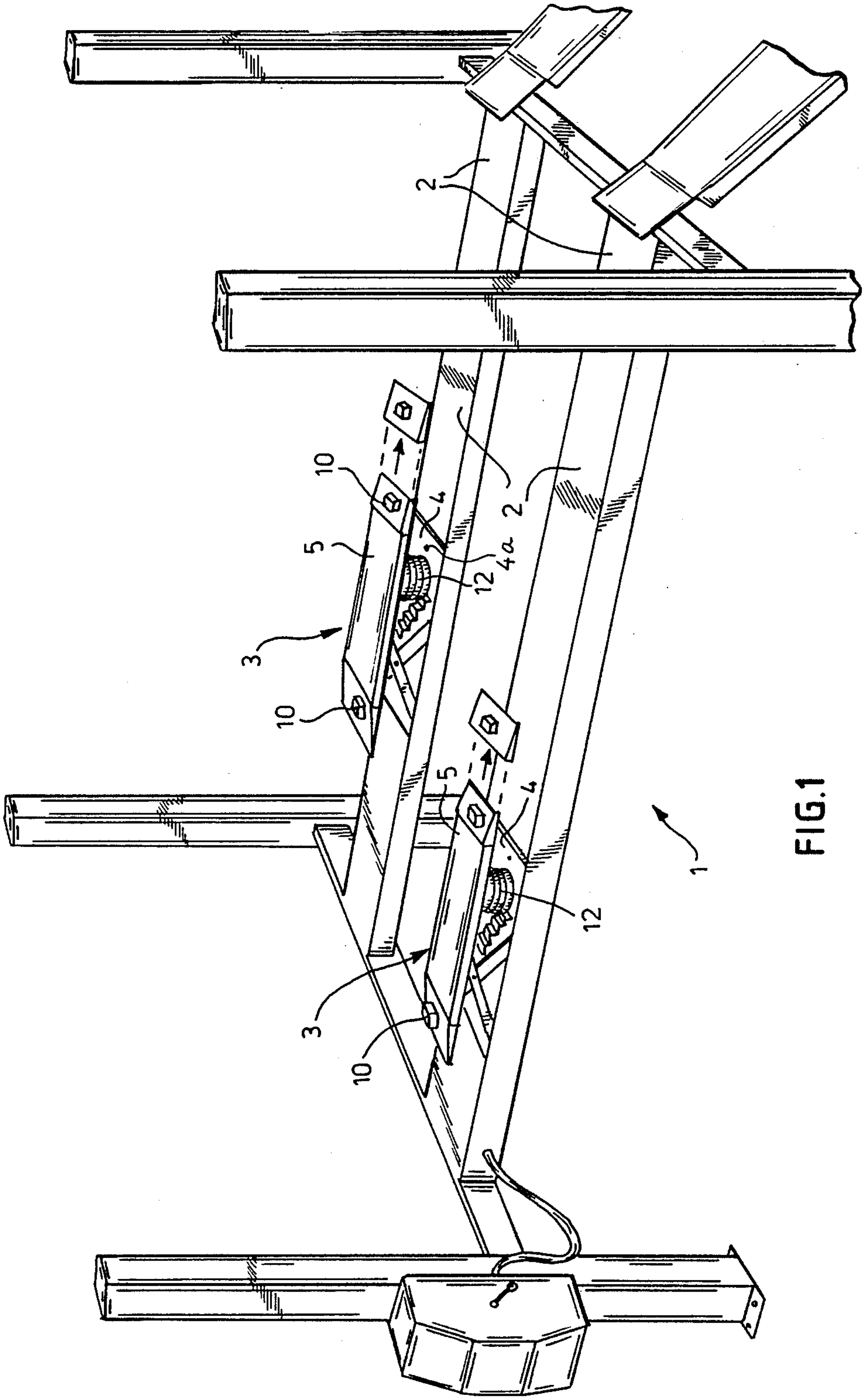
FIG. 1 is a perspective view of a four-column lifting platform with a lifting platform attachment mounted on each driving track.

A four-column lifting platform generally denoted as 1 including a lifting platform attachment 3 detachably secured as a separate unit on each of its driving tracks 2 is shown in FIG. 1.

The lifting platform attachment 3 includes a base plate 4 and a support plate 5; the base plate and consequently the entire lifting platform attachment is fastened to the driving track 2 by means of the screws 4*a* (FIGS. 1 and 2) can be removed if required.

The support plate 5 has two open channels or tubular members 6 and 6*a* arranged in the longitudinal direction, each of which slidably receives a support arm 7 and 7*a* therein. In the preferred embodiment, the openings and support arms have a generally rectangular cross section. At their ends, the two support arms are connected with one another by the jib plate 8. In this way, it is possible to extend the lifting platform attachment (as shown by the dashed lines in FIG. 3), so that even vehicles with a large wheel or axle base can be lifted without the hazard of such vehicles tipping over in the longitudinal direction.

For limiting the length of extension of jib plate 8, provision is made on the support arms 7 and 7*a* for a stop bar 9 having a nose 9*a* at its one end. The support plate 5 has a stop means 9*b* corresponding with the nose 9*a*. The length of extension is limited in that the nose 9*a* runs up to and abuts against the stop means 9*b* on the support plate 5. In the preferred embodiment, stop means 9*b* has a cross section in the form of a U-profile. The spacing between the two horizontal legs of the U-profile is dimensioned in such a way that the nose 9*a* of the stop bar 9 cannot be pulled through the U-profile. Thus, it is assured that the jib plate 8 can be extended only to a predetermined length. Therefore, the moment acting on the support arms 7 and 7*a* does not become excessive enough to cause bending of the arms.

The support plate 5 is stepped on one side (FIG. 2, arrow 5*a*). Such a stepped design replaces the wedge or inclined attachments, which are well known for signficantly extending the constructional length of the lifting platform attachment. The stepped design shortens the overall constructional length without, however, making it more difficult to drive the vehicle across the lifting platform attachment.

The jib plate 8, located on the other side of the support plate 5, has about half the thickness of the support plate 5, so that a step-like embodiment is obtained on this side as well.

Spacers 10 are located between the strut of the vehicle and the support plate 5 or jib plate 8. Since the stepped design produces a flat surface of the spacer 10 can be horizontally placed on the support or jib plate at any desired point. Consequently, it is possible to always select the most favorable point of attack for the force raising the vehicle. This is not the case with a wedge design since the spacer 10 would be placed on a sloped surface.

A scissors-type support 11 is arranged between the support plate 5 and the base plate 4. An air spring bellows 12 which causes the actual lifting motion of the support plate 5 is disposed outside of the scissors support in the lengthwise direction and intermediate the two sides of the scissors support. The scissors-like support 11 is comprised of two parallel pairs of scissors 11*a* and 11*b*, which are connected with one another by a support strut 13. At one end, each scissor of such a pair of scissors 11*a*, 11*b* is rigidly connected with the support or base plate, whereas its other end is movably arranged on the support or base plate, as conventionally taught.

Figure 4:
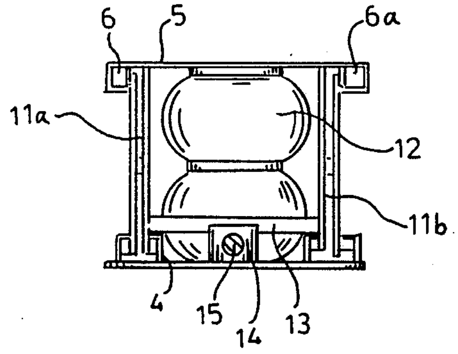
FIG. 4 is an end view of the lifting platform attachment taken along the arrow IV in FIG. 2.
Figure 5:
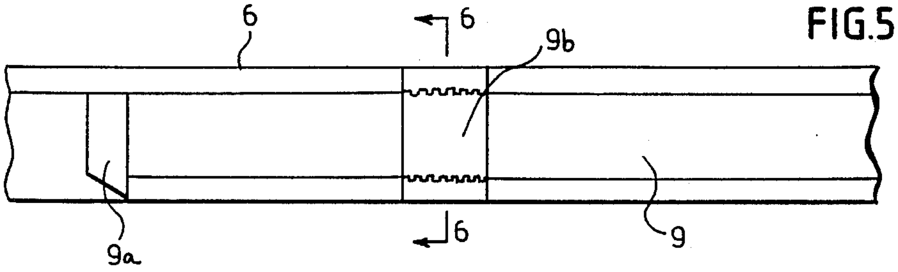
FIG. 5 is an enlarged side view of the stop bar for limiting the length of extension of the jib plate shown in FIG. 2.
Figure 6:
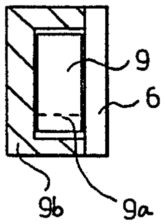
FIG. 6 is a sectional view taken along line VI—VI in FIG. 5.

The support plate 5 on the top and the base plate 4 on the bottom form the sealing plates for the air spring bellows 12. Therefore, no separate sealing plates are required at the top and bottom ends of the air spring bellows 12. This further minimizes the overall constructional height (FIG. 4) of the attachment.

A locking mechanism is formed by the support strut 13 and the stepped wedge 14. The latter is movable in the lengthwise direction. The locking mechanism prevents the scissors support from collapsing or folding up in the event of a pressure drop in the air spring bellows.

Figure 7:
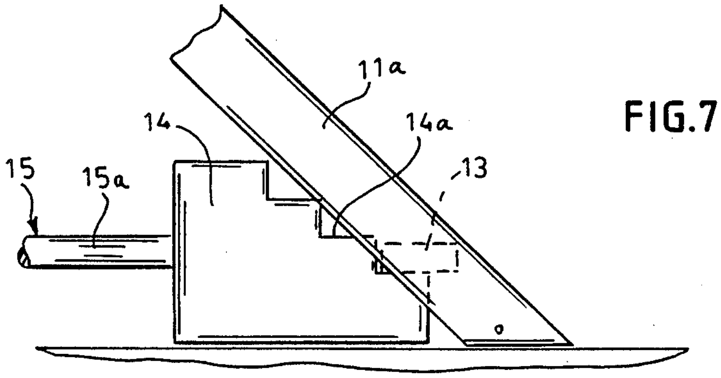
FIG. 7 is an enlarged side view of the locking mechanism shown in FIG. 2.

As can be seen in FIG. 7, the stepped wedge can be moved in the lengthwise direction relative to the lifting platform attachment by means of a piston-and-cylinder drive. The displacement of the piston or piston rod 15*a* is directly dependent upon the height of lift of the air spring bellows 12. Consequently, when a certain height or level of lift is reached, a corresponding step 14*a* of the stepped wedge 14 engages the support strut 13.

The lifting platform attachment is aligned on the driving track in such a way that the air spring bellows is located beneath the point or center of gravity of the heaviest of the vehicles to be lifted. The position of the center of gravity of the vehicle relative to the driving tracks is determined by the wheeltrack gauge or measuring disk. Normally, this gauge is arranged on the driving tracks. Therefore, the heaviest of vehicles can be lifted in a balanced state, so that the support arms 7, **7*a* of the jib plate 8 are not excessively stressed. The center of gravity of smaller and, therefore, lighter vehicles is not necessarily located above the air spring bellows 12**. However, while the support arms are stressed slightly more in this situation, it is insignificant as such vehicles have a lower weight.

Thus, while only a single embodiment of the present invention has been shown and described, it is obvious that many changes and modifications may be made thereunto, without departing from the spirit and scope of the invention.

What is claimed is:

1. A lifting platform attachment for motor vehicle lifting platforms or drive-on pits with driving tracks, comprising:

a lifting device mounted on each driving track and adapted for fitting an existing equipment, each lifting device comprising a scissors support with two parallel pairs of scissors which are not acted on directly by a lifting means, a support plate supported by the scissors support, and at least one air spring bellows, being the only mechanical lifting means and which upon deflation permits substantially complete collapse of the lifting device, arranged beneath the support plate, the scissors support and the air spring bellows being mounted on a base plate and said support plate and said base plate form the top and bottom, respectively, sealing plates for the air spring bellows so that the lifting device has a low profile when collapsed to permit a motor vehicle this is to be lifted to drive thereover, and a locking mechanism for the scissors support comprised of a support strut arranged between the two parallel pairs of scissors and a stepped wedge supporting the support strut, wherein during the lifting movement of the air spring bellows, the stepped wedge is pushed under the support strut by means of a piston and cylinder drive whereby steps on the wedge act as a support for the strut to prevent collapse of the lifting platform.

2. A lifting platform attachment according to claim 1, wherein the displacement of the piston is dependent upon the height of lift of the air spring bellows.

* * * * *